United States Patent
Bai et al.

(10) Patent No.: US 10,241,836 B2
(45) Date of Patent: Mar. 26, 2019

(54) RESOURCE MANAGEMENT IN A VIRTUALIZED COMPUTING ENVIRONMENT

(71) Applicant: VMware, Inc., Palo Alto, CA (US)

(72) Inventors: Luo Bai, Shanghai (CN); Lei Ding, Shanghai (CN); Yifeng Mao, Shanghai (CN); QingChao Gong, Shanghai (CN); Lei Zhang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 70 days.

(21) Appl. No.: 14/301,341

(22) Filed: Jun. 11, 2014

(65) Prior Publication Data

US 2015/0363238 A1  Dec. 17, 2015

(51) Int. Cl.
*G06F 9/50* (2006.01)
*G06F 9/455* (2018.01)

(52) U.S. Cl.
CPC ........ *G06F 9/5022* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2009/0288084 A1* | 11/2009 | Astete | ................. | G06F 9/45533 709/226 |
| 2011/0099267 A1* | 4/2011 | Suri | ...................... | G06F 9/4856 709/224 |
| 2014/0019998 A1* | 1/2014 | Huang | ................. | G06F 9/45558 719/321 |
| 2014/0096134 A1* | 4/2014 | Barak | ................. | G06F 9/45558 718/1 |
| 2014/0297842 A1* | 10/2014 | Yoshimoto | ............ | G06F 3/0625 709/224 |
| 2015/0106520 A1* | 4/2015 | Breitgand | ........... | G06F 9/45558 709/226 |
| 2015/0286492 A1* | 10/2015 | Breitgand | ........... | G06F 9/45558 718/1 |
| 2015/0355923 A1* | 12/2015 | Keller | ................. | G06F 9/45558 718/1 |
| 2016/0139949 A1* | 5/2016 | Jagannath | ............. | G06F 9/5022 718/1 |

* cited by examiner

*Primary Examiner* — Wynuel S Aquino
(74) *Attorney, Agent, or Firm* — Su IP Consulting

(57) ABSTRACT

According to examples of the present disclosure, a method is provided to perform resource management in a virtualized computing environment. The method may comprise monitoring multiple first virtual machines to update a status of each first virtual machine based on a resource consumption level of resources allocated to the first virtual machine. The method may further comprise: in response to receiving a request to allocate resources to a second virtual machine, selecting at least one of the multiple first virtual machines with an inactive status to satisfy the request. Resources allocated to the selected at least one of the multiple first virtual machines may then be released and reallocated to the second virtual machine.

15 Claims, 6 Drawing Sheets

RESOURCE MANAGEMENT IN A VIRTUALIZED COMPUTING ENVIRONMENT

BACKGROUND

Unless otherwise indicated herein, the approaches described in this section are not admitted to be prior art by inclusion in this section.

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory and network resources to run an operating system and different applications.

DETAILED DESCRIPTION

Figure 1:
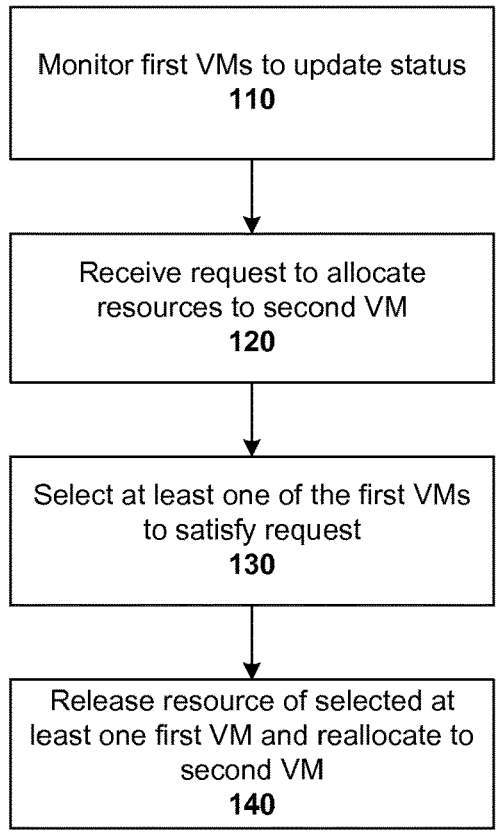
FIG. 1 is a flowchart of an example process for resource management in a virtualized computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Conventionally, a time-based factor is generally used to manage resource allocation in a virtualized computing environment. For example, during the provisioning of a virtual machine, a "lease" may be configured to set a time period for which the resources are allocated to a virtual machine. When the lease approaches expiry, an email notice is sent to a user (e.g., system administrator), who may manually renew the lease or simply ignore it. After the lease expires, the virtual machine may be deleted and its allocated resources released.

According to examples in the present disclosure, a more elastic resource management approach that is based on resource consumption is used. Depending on a resource consumption level of a virtual machine, the status of the virtual machine may be updated from active to inactive. Instead of merely relying on a time-based factor, monitoring the resource consumption level provides more information as to whether virtual machines are actively (or inactively) utilizing the resources allocated to them. Where necessary, underutilized resources of inactive virtual machines may be reallocated to other virtual machines.

As such, according to examples of the present disclosure, it is not simply a question of how long the virtual machines have been allocated with the resources, but whether (and/or to what extent) they are using the resources. When new resource allocation requests are received, virtual machines having an inactive status may then be selected for decomposition to satisfy the requests. This improves resource utilization in the virtualized computing environment because resources may be allocated and reallocated to virtual machines that most need them.

FIG. 1 is a flowchart of example process 100 for resource management in a virtualized computing environment. Example process 100 may include one or more operations, functions, or actions illustrated by one or more blocks, such as blocks 110 to 140. The various blocks may be combined into fewer blocks, divided into additional blocks, and/or eliminated based upon the desired implementation.

At block 110 in FIG. 1, multiple first virtual machines in the virtualized computing environment are monitored, so that a status of each first of the multiple virtual machines may be updated. For example, the status may be updated from an active status to an inactive status based on a resource consumption level of resources allocated to the first virtual machine. The resource consumption level may be measured using any suitable approach, such as based on the consumption of one or more of: CPU resources, memory resources, storage resources and network resources.

To keep track of the status of first virtual machines, two lists may be maintained. One is an active list that is associated the active status, and the other is an inactive list associated with the inactive status. Based on a resource consumption level, they may be moved from the active list to the inactive list when the status is updated. Their position on the active list or inactive list may be updated according to their level of activity or inactivity. For example, a head position on the active list may represent a high level of activity while a tail position represents a low level of activity. In contrast, a head position on the inactive list may represent a low level of inactivity while a tail position represents a high level of activity.

At blocks 120 and 130 in FIG. 1, in response to receiving a request to allocate resources to a second virtual machine, at least one of the multiple first virtual machines with an inactive status is selected to satisfy the request. For example, the selection may include comparing the resources allocated to the selected at least one of the multiple first virtual machines with that requested by the second virtual machine, such as in terms of CPU resources, memory resources, storage resources, network resources, or a combination thereof. At block 140, resources allocated to the selected at least one of the first virtual machines, and reallocated to the second virtual machine.

Throughout the present disclosure, the terms "first" and "second" are merely used to facilitate easy reference, and are not intended to represent any specific order. For example, the term "first virtual machines" may generally refer to virtual machines monitored by a server to update their status according to block 110 in FIG. 1. The term "second virtual machine" may generally refer to a virtual machine to which resources are to be allocated based on the request received according to block 120 in FIG. 1.

Virtualized Computing Environment

Figure 2:
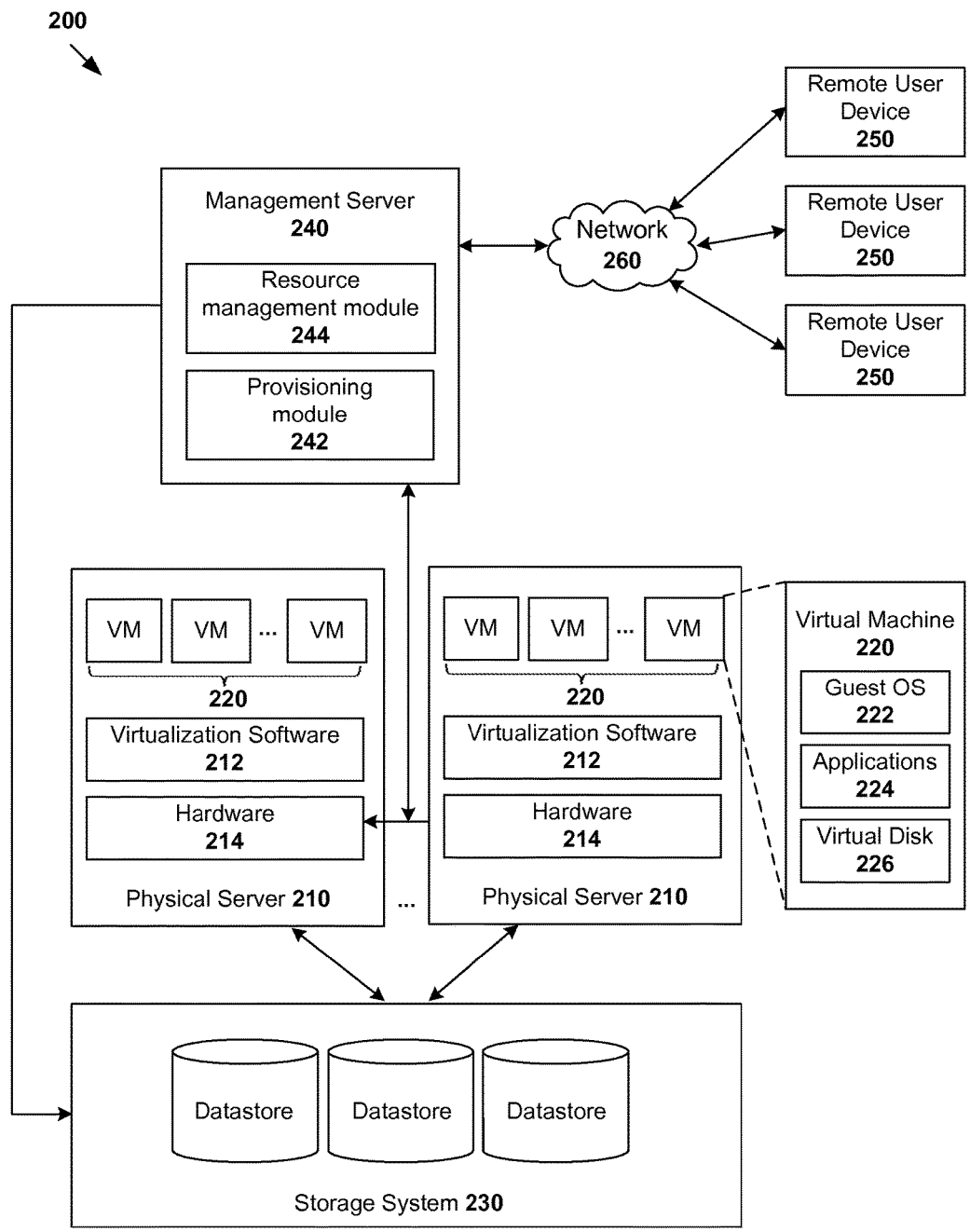
FIG. 2 is a schematic diagram illustrating an example virtualized computing environment in which resource management may be performed.

FIG. 2 is a schematic diagram of example virtualized computing environment 200 in which resource management may be implemented. Although an example is shown, it should be understood that example computing environment 200 may include additional or alternative components, and may have a different configuration.

Virtualized computing environment 200 includes physical servers 210 (also known as "hosts") that each execute virtualization software 212 (e.g., hypervisor) and include suitable hardware 214 to support multiple virtual machines 220. Virtualization software 212 maintains a mapping between resources allocated to virtual machines 220 and physical resources provided by physical servers 210 and storage system 250. In practice, there may be any suitable number of physical servers 210, each supporting any suitable number of virtual machines 220.

Management server 240 supports various services that may be accessed by remote user devices 150 via network 260, such as using an application programming interface (API). Remote user devices 150 may be operated by any suitable users, such as system administrators, organization administrators, database users, application developers, system architects, etc. Any suitable computing device may be used as remote user device 150, such as desktop computer, mobile device, tablet computer, and personal digital assistant, etc.

Management server 240 may include any suitable modules to support the services. For simplicity, in the example in FIG. 2, management server 240 includes provisioning module 242 for the provisioning and management of virtual machines 220, and resource management module 244 (also known as "resource scheduler") for management of resources in virtualized computing environment 200. Management server 240 may also support services relating to the deployment of an automated, on-demand cloud infrastructure, such as the delivery and management of private and hybrid cloud services, deployment across multi-vendor, multi-cloud infrastructure, application design process streamlining, application release automation, etc.

In practice, management server 240 may be implemented by multiple logical or physical entities, and as such, provisioning module 242 and resource management module 244 may be implemented by multiple logical or physical entities. The consideration as to whether management server 240 is implemented on one or multiple entities (e.g., physical machines) may depend on the performance of the underlying entities.

When virtual machine 120 is created via provisioning module 242, a certain amount of virtual resources are allocated to virtual machine 120, such as to support guest operating system 222 and applications 224. For example, the allocated resources may include CPU resources (e.g., processors), memory resources (e.g., random access memory), network resources (e.g., access networks, group of ports, etc.) and storage resources (e.g., virtual disk 226 supported by storage system 230), etc.

The resources may be allocated to virtual machine 220 as a "resource bundle", which generally refers to a set of compatible computing resources allocated as a group. Further, a pool of CPU and memory resources of physical servers 110 may be bundled and assigned as a "resource pool" to virtual machine 220. Storage resources may be allocated in the form of "virtual disk" 226, which may generally refer to file or files on a file system that appear as a single hard disk to guest operating system 222. Virtual disk 226 is generally used to store data relating to guest operating system 222 and applications 224.

Resource management module 244 may use information relating to virtual machines 220 (e.g., provided by provisioning module 242) to manage how CPU, memory, storage and network resources are allocated to different virtual machines 220. As will be explained with reference to FIG. 3 and FIG. 4, resource management module 244 monitors virtual machines 220 and updates their status based on how they utilize resources allocated to them.

Virtual Machine Monitoring

To keep track of the status of virtual machines 220, resource management module 244 may maintain two lists: active list and inactive list. Active list includes (in order of priority or level of activity) virtual machines 220 having an active status, while inactive list (also in order of priority or level of inactivity) includes virtual machines having an inactive status. The status of virtual machines 220, or their position on the active or inactive list, may be updated by resource management module 244.

Figure 3:
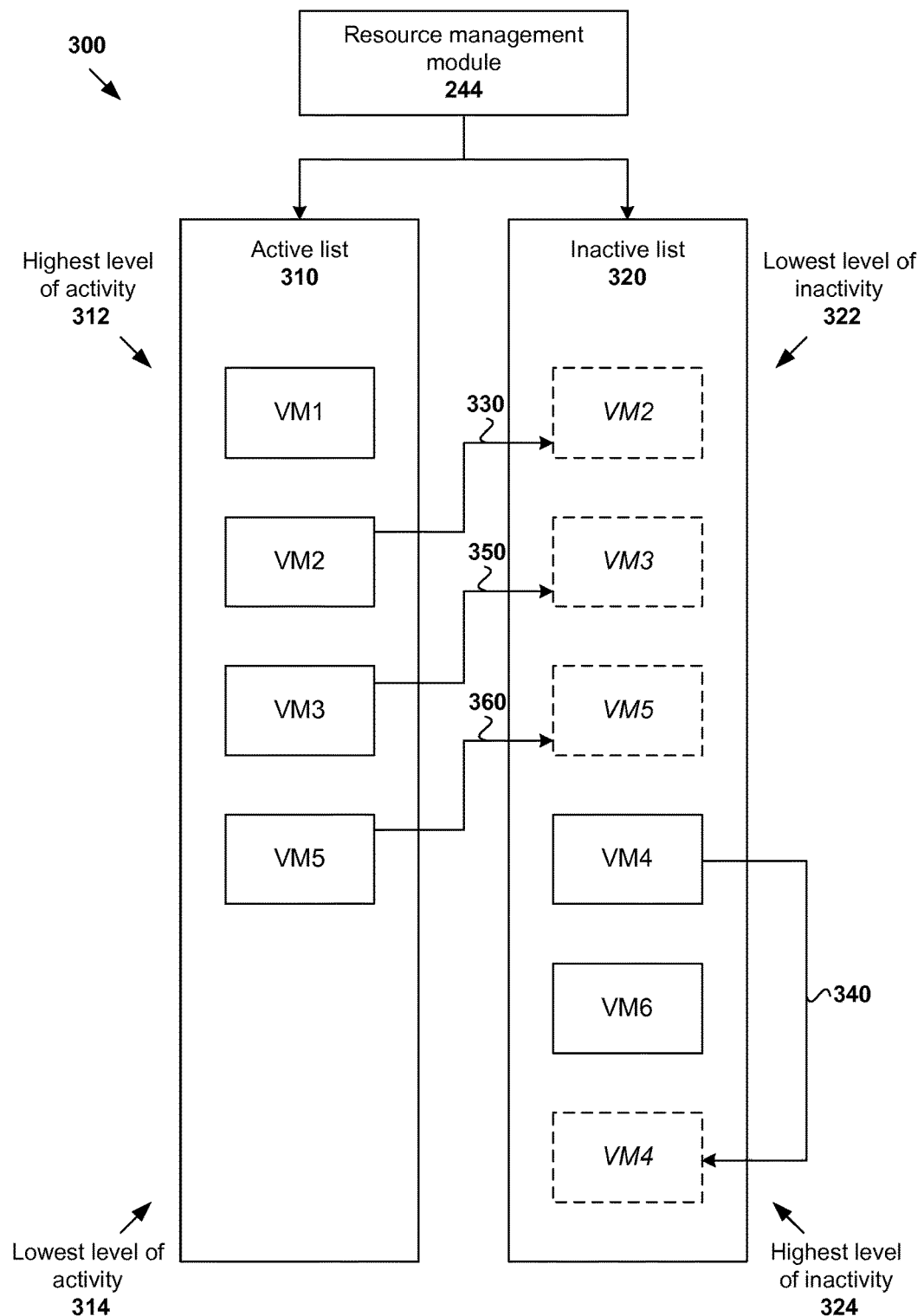
FIG. 3 is a schematic diagram illustrating an example active list and an example inactive list maintained by a resource management module in the example virtualized computing environment in FIG. 2.

FIG. 3 is a schematic diagram illustrating example active list 310 and example inactive list 320 maintained by resource management module 244 in example virtualized computing environment 200 in FIG. 2. In this example, resource management module 244 monitors six virtual machines 220 in virtualized computing environment 200, such as "VM1", "VM2", "VM3" and "VM5" on active list 310, and "VM4" and "VM6" on inactive list 320. "VM1" to "VM6" might have been created for any suitable purpose. According to example process 100 in FIG. 1, "VM1" to VM6" may also be referred to as "first virtual machines" monitored by resource management module 244.

Resource management module 244 may update the status of "VM1" to "VM6" by changing their status information as represented using active list 310 or inactive list 320. For example, the status of "VM2" may be updated from active to inactive by moving "VM2" from active list 310 and inactive list 320. Similarly, the status of "VM6" may be updated from inactive to active by moving "VM6" from inactive list 320 to active list 310. Resource management module 244 may place virtual machines 220 (e.g., "VM1") at the head position of active list 310 when they are created or reactivated.

In the example in FIG. 3, boxes in full lines represent the initial positions of virtual machines 220 before the update, and those in dashed lines represent the new positions of virtual machines 220 after the update. Referring to their initial positions (i.e., boxes in full lines), "VM1" is at the head position of active list 310 that represents the highest level of activity (see 312), followed by "VM2" and "VM3". "VM5" is at the tail position of active list 310 that represents the lowest level of activity (see 314). Also referring to their initial positions on inactive list 320 (i.e. boxes in full lines), "VM4" is at the head position that represents the lowest level of inactivity (see 322), while "VM6" is at the tail position that represents the highest level of inactivity (see 324).

Resource management module 244 may update the level of activity or inactivity of virtual machine 220 by changing its position within active list 310 or inactive list 310. For example, "VM1" may be moved down on active list 310 as its level of activity decreases. Similarly, "VM4" may be moved down on inactive list 320 as its level of inactivity increases. Examples 330 to 360 in FIG. 3 illustrate how resource management module 244 may update the status of "VM1" to "VM6", and will be explained with reference to FIG. 4, which is related to block 110 in FIG. 1.

Figure 4:
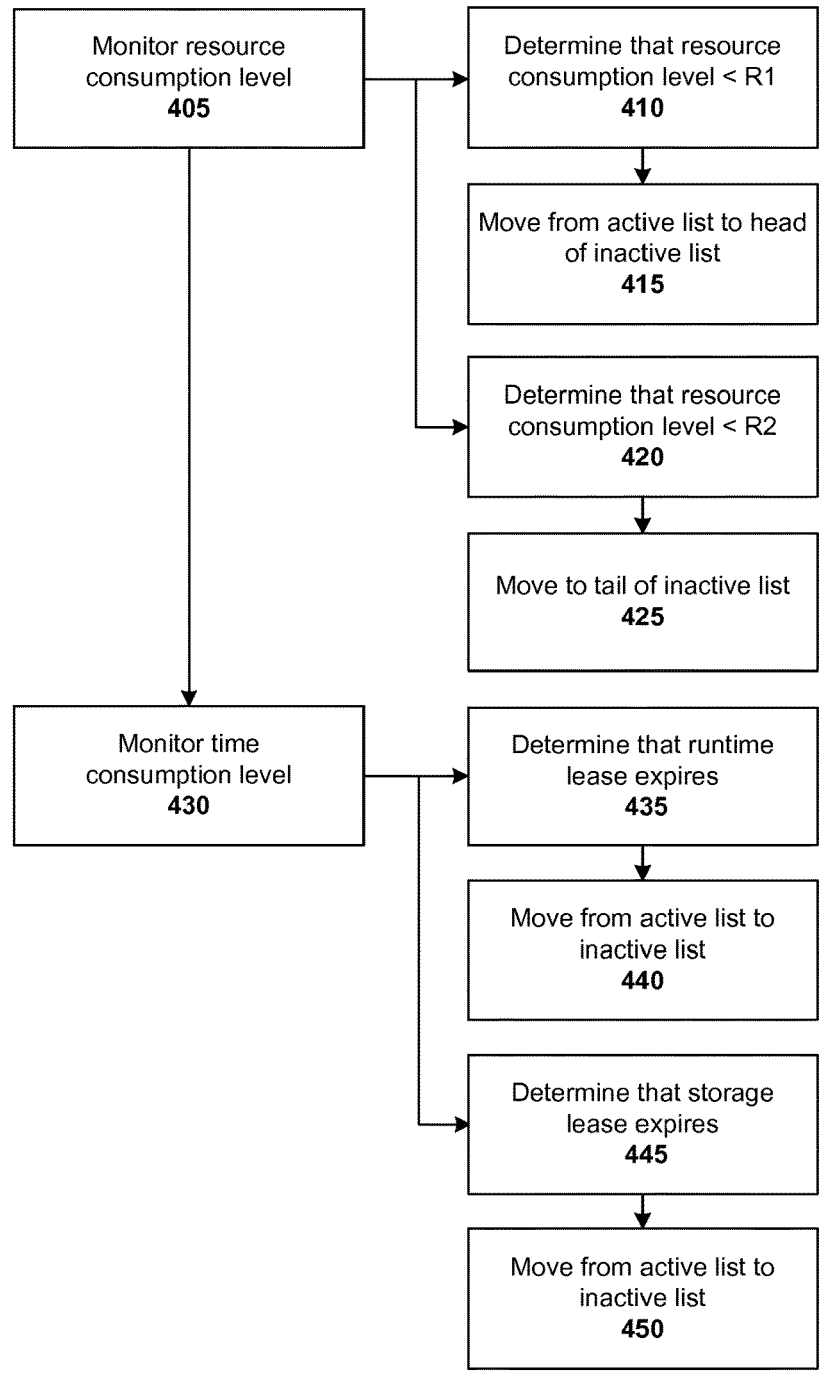
FIG. 4 is a flowchart of an example process for virtual machine monitoring when performing resource management in the example virtualized computing environment in FIG. 2.

FIG. 4 is a flowchart of example process 400 for virtual machine 220 (e.g., "VM1" to "VM6") monitoring when performing resource management in example virtualized computing environment 200 in FIG. 2. Example process 400 may include one or more operations, functions, or actions illustrated by one or more blocks, such as blocks 405 to 450. The various blocks may be combined into fewer blocks, divided into additional blocks, and/or eliminated based upon the desired implementation.

At block 405 in FIG. 4, resource management module 244 monitors a resource consumption level of virtual machine 220, such as CPU utilization, memory utilization, storage Input/Output (I/O) and network I/O. Using "VM2" on active list 310 as an example, it may only be using 20% of its assigned memory resources (e.g., 20% of 5 GB of memory, etc.) and 12% of its assigned CPU resources (e.g., CPU is idle 88% of the time, etc.).

The network I/O of "VM2" may be monitored based on the number of packets it transmits or receives, where a low packet count generally indicates a low level of network activity. Alternatively or additionally, the network I/O may be measured based on the size of the packets, such as the total data transferred per time unit (e.g., in terms of Megabyte per second) that may be calculated as the size of a single packet multiplied by the number of packets per time unit. The total data transferred per time unit generally provides a better indication of network activity because the network might be very busy with transferring large packets although the packet count might be low. Similarly, the storage I/O may be monitored based on the size of the packets.

Blocks 410 and 415 in FIG. 4 are related to "VM2" in example 330 in FIG. 3. In this case, if the resource consumption level of virtual machine 220 (e.g., "VM2") is less than a first predetermined level "R1", resource management module 244 updates its status from active to inactive. For example, level "R1" may be defined using one or more of: minimum CPU utilization level (e.g., 15%), minimum memory utilization level (e.g., 25%), minimum network I/O level and minimum storage I/O level. Updating "VM2" to an inactive status moves "VM2" from active list 310 to the head position of inactive list 320.

Blocks 420 and 425 in FIG. 4 are related to "VM4" in example 340 in FIG. 3. In this case, resource management module 244 determines whether the resource consumption level of virtual machine 220 (e.g., "VM4") is less than a second predetermined level "R2" that is below "R1" (i.e. "R2" <"R1"). Similar to "R1", level "R2" may be defined using one or more of: minimum CPU utilization level (e.g., 5%), minimum memory utilization level (e.g., 10%), minimum network I/O level and minimum storage I/O level. If yes (i.e. level <"R2"), resource management module 244 flags virtual machine 220 (e.g., "VM4") as suitable for deletion or decomposition. In this case, virtual machine 220 (e.g., "VM4") may be moved to the tail position on inactive list 320 (i.e. most inactive).

At block 430 in FIG. 4, resource management module 244 monitors a time consumption level of virtual machine 220. For example, a user may configure a "runtime lease" and a "storage lease" for "VM1" to "VM6." The "runtime lease" is generally set to prevent inactive virtual machines 220 from consuming the allocated computing resources. The "storage lease" functions in a similar way to reclaim storage resources provided by storage system 230. For example, the runtime lease may be set to 10 days and go into effect once virtual machine 220 is powered on. The storage lease (e.g., set to 5 days) generally goes into effect after the runtime lease expires.

Blocks 435 and 440 in FIG. 4 are related to "VM3" in example 350 in FIG. 3. In this case, when the runtime lease (e.g., 10 days) expires, resource management module 244 updates the status of virtual machine 220 (e.g., "VM3") from active to inactive by moving it from active list 310 to inactive list 320.

Blocks 445 and 450 in FIG. 4 are related to "VM5" in example 360 in FIG. 3. In this case, when the storage lease (e.g., 5 days) expires, resource management module 244 updates the status of virtual machine 220 (e.g., "VM5") from active to inactive by moving it from active list 310 to inactive list 320. If virtual machine 220 (e.g., "VM5") is already on inactive list 320 (e.g., after its runtime lease expires), it may be moved towards the tail position of inactive list 320 to represent a higher level of inactivity.

Although not shown in FIG. 3, when blocks 445 to 450 are performed in combination with blocks 405, 420 to 425, virtual machine 220 (e.g., "VM5") may be further moved to the tail position of inactive list 320 if its consumption level is lower than "R2". Further, although not shown in FIG. 3, prior to moving virtual machine 220 from active list 310 to inactive list 320, resource management module 244 checks whether virtual machine 220 is on active list 310.

After the status of virtual machines 220 are updated according to example process 400 in FIG. 4, "VM1" remains on active list 310, while "VM2", "VM3", "VM5", "VM6" and "VM4" are on inactive list 320 (see boxes in dashed lines for "VM3", "VM2", "VM5" and "VM4"). Virtual machines 220 on inactive list 320 may be handled in several ways. For example, virtual machines 220 on inactive list 320 (e.g., "VM2", "VM3", "VM5", "VM6" and "VM4") may be reactivated manually by users via remote user devices 250, or automatically by resource management module 244 to return them to active list 310 again.

To facilitate automatic reactivation, a computer program (e.g., daemon program, etc.) may be run on virtual machine 220 to trigger the execution of applications 224 again after a long period of inactivity. In this case, reactivated virtual machine 220 may be moved from inactive list 320 to active list 310. In another example, a user may purchase another runtime lease (e.g., 10 days) for virtual machine 220 on inactive list 320. In this case, in response to receiving a request for lease renewal (e.g., runtime lease), resource management module 244 moves virtual machine 220 to active list 310.

Users may also send a request to management server 240 to increase the resource consumption levels (e.g., "R1" and "R2") so that virtual machines 220 may remain on active 310 or inactive list 320. The levels may be increased, for example, by paying a fee. This provides a monetary incentive for users to improve resource utilization.

Further, virtual machines 220 on inactive list 320 may be deleted or decomposed and have their allocated resources released to meet a new allocation request. As will be explained with reference to FIG. 5, the selection of virtual machine 220 with an inactive status for decomposition depends on the amount and type of resources to be allocated.

Reallocation of Resources

Figure 5:
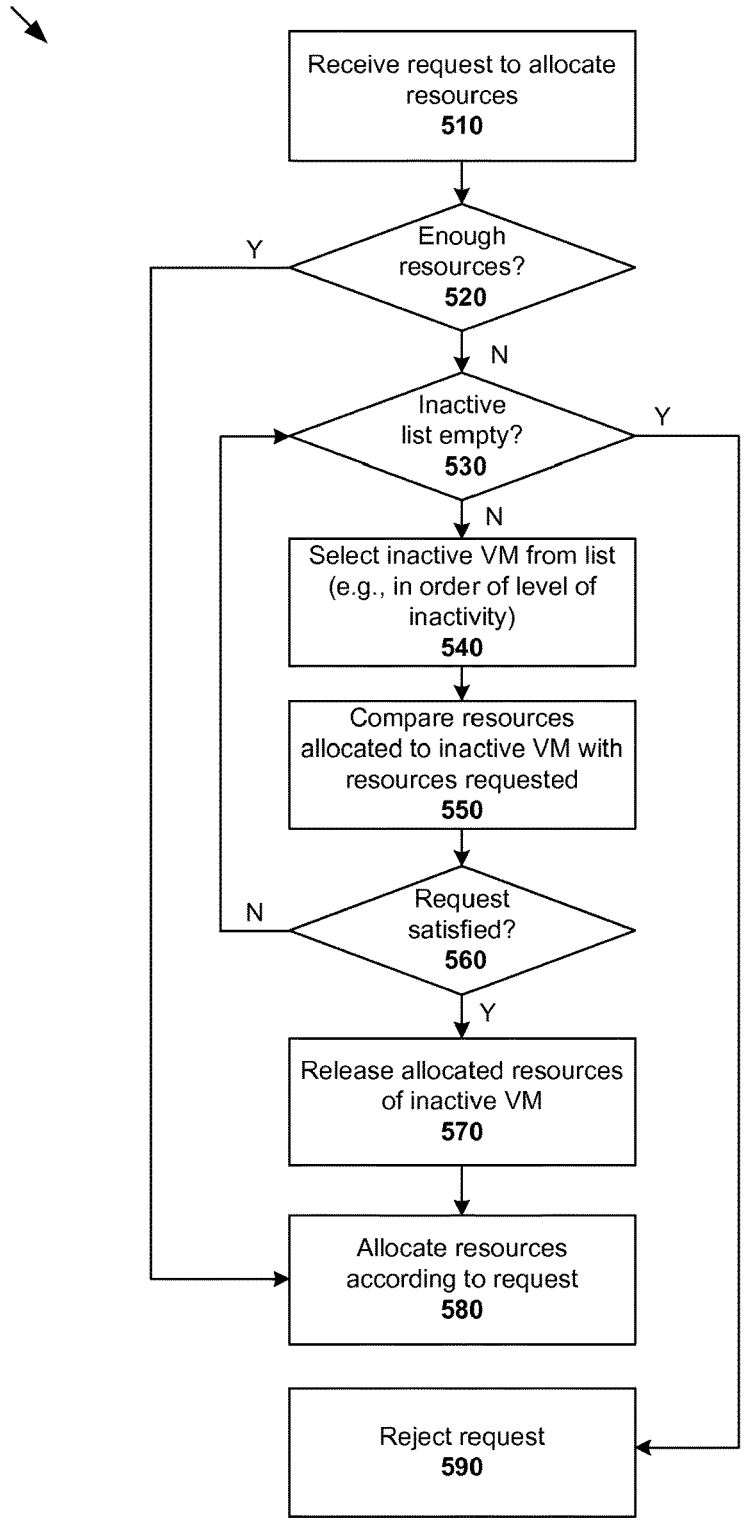
FIG. 5 is a flowchart of an example process for resource allocation when performing resource management in a virtualized computing environment in FIG. 2.

FIG. 5 is a flowchart of example process 500 for resource allocation when performing resource management in example virtualized computing environment 200 in FIG. 2. Example process 500, which is related to blocks 120 to 140 in example process 100 in FIG. 1, may include one or more operations, functions, or actions illustrated by one or more blocks, such as blocks 510 to 550. The various blocks may be combined into fewer blocks, divided into additional blocks, and/or eliminated based upon the desired implementation.

At block 510 in FIG. 5, resource management module 244 receives a request to allocate resources. The request may be received via provisioning module 242 to allocate resources to a new virtual machine (e.g., "VM7"), or an existing one (e.g., "VM1") that is active and requires more resources. According to blocks 120 to 140 in example process 100 in FIG. 1, "VM7" or VM1" may also be referred to as "second virtual machine" to which resources are to be allocated.

The request may specify the amount and type of resources requested, including one or more of: CPU, memory, storage and network resources. In practice, some requests may ask for more CPU resources, and others more storage resources depending on the applications 224 of virtual machine 220.

At block 520 in FIG. 5, resource management module 244 determines whether there are enough available resources to satisfy the request. If yes, at block 580, resource management module 244 allocates the resources according to the request. Otherwise, example process 500 proceeds to block 530.

At block 530 in FIG. 5, resource management module 244 determines whether there is any virtual machine 220 with an inactive status by checking inactive list 320. If not, at block 590, the request is rejected because there is no candidate virtual machine 220 on inactive list 320 that can be decomposed to satisfy the request. Otherwise, example process 500 proceeds to block 540.

At blocks 540 and 550 in FIG. 5, resource management module 244 selects one of virtual machines 220 on inactive list 320 for decomposition. Since inactive list 320 may include multiple candidates, they may be selected based on their position on inactive list 320, such as from the most inactive 324 at the tail position to least inactive 322 at the head position (e.g., in the order of "VM4", "VM6", "VM5", "VM3" and "VM2" in FIG. 3). This ensures that the candidates most suitable for decomposition are considered first.

Additionally or alternatively, virtual machine 220 may be selected from inactive list 320 based on their resource consumption level and/or time consumption level. For example, virtual machine 220 whose resource consumption level is the furthest from the second consumption level (e.g., "R2" in FIG. 4) is selected first. In another example, virtual machine 220 with the oldest expired storage lease is selected first.

At block 550 in FIG. 5, resource management module 244 determines whether the request can be satisfied by decomposing virtual machine 220 selected at block 550 (e.g., "VM4"). For example, resources allocated to virtual machine 220 (e.g., "VM4") are compared against resources requested in the request, such as in terms of CPU, memory, storage and network resources.

At blocks 560 and 570 in FIG. 5, if the request can be satisfied, resource management module 244 releases the resources allocated to virtual machine 220 selected at block 550 (e.g., "VM4") before reallocating the released resources according to the request (e.g., to new "VM7").

Otherwise (i.e. request cannot be satisfied), resource management module 244 repeats blocks 530 to 560. Depending on the request, multiple virtual machines 220 (e.g., "VM4" and "VM6") may be selected for decomposition to satisfy the request. For example, memory resources allocated to "VM4" alone does not satisfy the request. However, when combined with the memory resources allocated to "VM6", the request can be satisfied.

Based on the examples discussed with reference to FIG. 1 to FIG. 5, resource management module 244 is able to keep track of whether virtual machines 220 are active or inactive, and their level of activity or inactivity. When a request to allocate resources is received, resource management module 244 may then select at least one inactive virtual machine 220 for decomposition such that under-utilized resources may be reallocated and better used by another virtual machine 220.

Computer System

Figure 6:
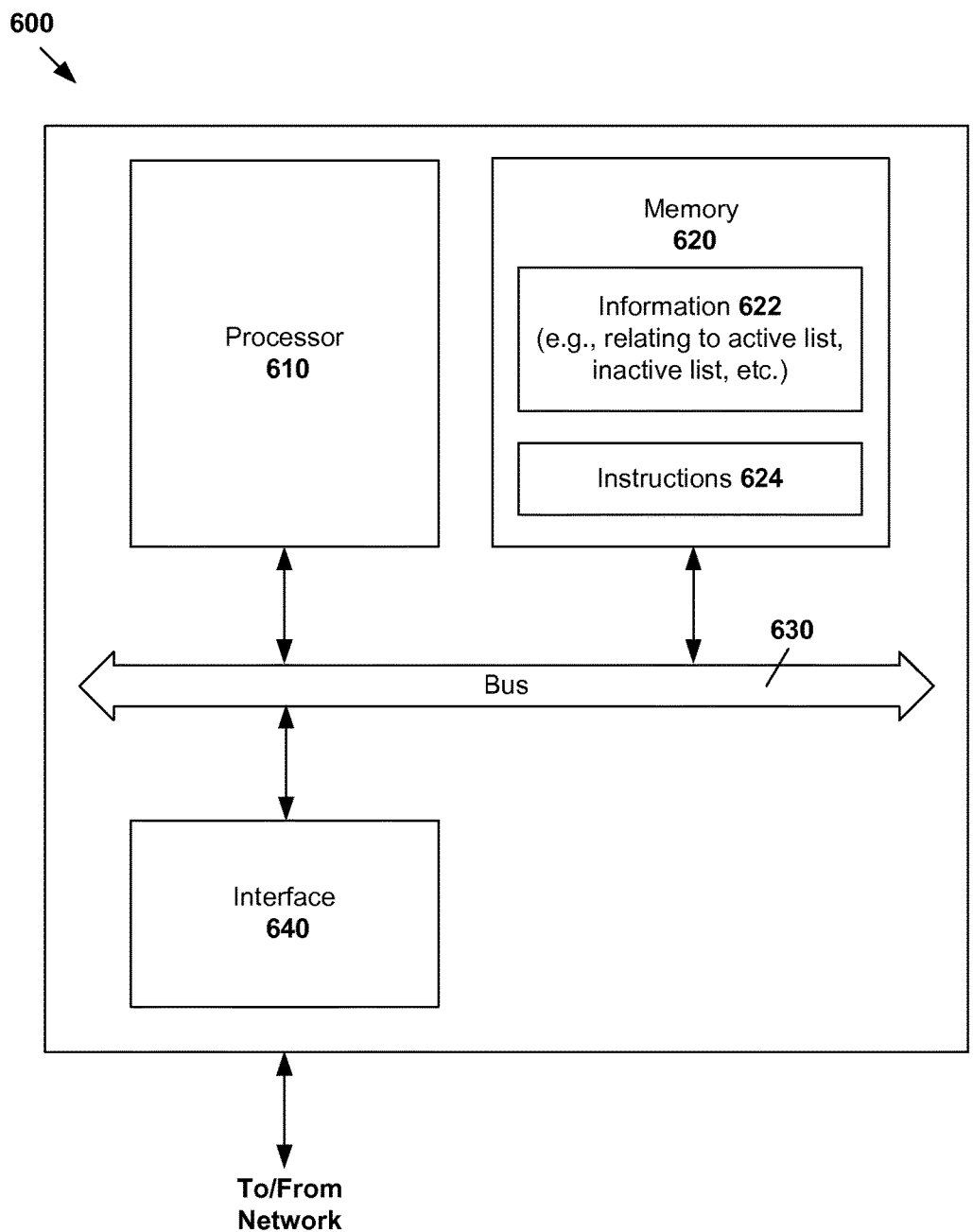
FIG. 6 is a schematic diagram illustrating a computer system for resource management.

The above examples can be implemented by hardware, software or firmware or a combination thereof. FIG. 6 is an example system configured to perform resource management, in accordance to at least some examples in the present disclosure. Example system 600 may include processor 610, memory 620, network interface device 640, and bus 630 that facilitate communication among these illustrated components and other components.

Processor 610 is to perform processes described herein with reference to FIG. 1 to FIG. 5. Memory 620 may store relevant information 622 to perform resource management, such as information relating to active list 310 and inactive list 320, etc. Memory 620 may further store machine-readable instructions 624 executable by processor 610 to cause processor 610 to perform processes described herein with reference to FIG. 1 to FIG. 5.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The figures are only illustrations of an example, wherein the units, components or processes shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to perform resource management in a virtualized computing environment, comprising:
   monitoring multiple first virtual machines to update a status of each first virtual machine to an inactive status based on a resource consumption level of resources allocated to the first virtual machine and to maintain an inactive list associated with the inactive status, wherein monitoring the multiple first virtual machine further comprises:
      maintaining an active list that includes at least one of the multiple first virtual machines associated with an active status and the inactive list;
      updating the status of each first virtual machine from the active status to the inactive status by moving the first virtual machine from the active list to the inactive list;
      in response to determining that the resource consumption level is lower than a first predetermined level, moving the first virtual machine to a position on the inactive list that represents a low level of inactivity;
      in response to determining that the resource consumption level is lower than a second predetermined level below the first predetermined level, moving the first virtual machine to a position on the inactive list that represents a high level of inactivity; and
   in response to receiving a request to allocate resources to a second virtual machine, checking the inactive list to determine whether any of the multiple first virtual machines has the inactive status, and in response to the inactive list including at least one of the multiple first virtual machines:
      selecting, for having a higher level of inactivity among the multiple first virtual machines with the inactive status, at least one of the multiple first virtual machines allocated with resources that are sufficient to satisfy the requested resources in the request from the inactive list, wherein the higher level of inactivity is associated with an order on the inactive list;
      releasing resources allocated to the selected at least one of the multiple first virtual machines; and
      reallocating the released resources to the second virtual machine.

2. The method of claim 1, further comprising: based on a request, reactivating the first virtual machine by moving the first virtual machine from the inactive list to the active list, or changing a position of the first virtual machine on the inactive list to represent a lower level of inactivity.

3. The method of claim 1, wherein monitoring the multiple first virtual machines is further to update the status of each first virtual machine based on a runtime lease, a storage lease, or both, of the first virtual machine.

4. The method of claim 3, wherein monitoring the multiple first virtual machines further comprises:
   in response to determining that the runtime lease has expired, moving the first virtual machine from the active list to the inactive list.

5. The method of claim 3, wherein monitoring the multiple first virtual machines further comprises:
   in response to determining that the storage lease has expired, moving the first virtual machine to a position on the inactive list that represents a high level of inactivity.

6. The method of claim 1, wherein selecting the at least one first virtual machine further comprises:
   selecting the at least one of the multiple first virtual machines based on a ranking of the level of inactivity from a position of the inactive list that represents a highest level of inactivity to a position of the inactive list that represents a lowest level of inactivity;
   comparing resources allocated to the at least one first virtual machines with resources requested in the request; and
   based on the comparison, selecting the at least one first virtual machine if release of the resources allocated to the at least one first virtual machine satisfies the resources requested in the request.

7. The method of claim 1, the resource consumption level includes a consumption level of one or more of: central processing unit (CPU) resources, memory resources, storage resources and network resources.

8. The method of claim 1, further comprising:
   in response to the inactive list including no virtual machine, rejecting the request to allocate resources to the second virtual machine; and
   wherein the selecting at least one of the multiple first virtual machines allocated with resources that are sufficient to satisfy the requested resources further includes comparing resources allocated to a first candidate virtual machine of the multiple first virtual machines against the requested resources,
   in response to resources allocated to the first candidate virtual machine are not sufficient to satisfy the requested resources, comparing resources allocated to a second candidate virtual machine of the multiple first virtual machines and to the first candidate virtual machine against the requested resources, wherein the first candidate virtual machine has the higher level of inactivity and arranged closer to a tail position on the inactive list than the second candidate virtual machine,
   in response to resources allocated to the first candidate virtual machine and the second candidate virtual machine are sufficient to satisfy the requested resources, wherein the releasing resources allocated to the selected at least one of the multiple first virtual machines includes releasing resources allocated to the first candidate virtual machine and the second candidate virtual machine.

9. A non-transitory computer-readable storage medium that includes a set of instructions which, in response to execution by a processor, causes the processor to perform resource management in a virtualized computing environment, comprising:
   monitoring multiple first virtual machines to update a status of each first virtual machine to an inactive status based on a resource consumption level of resources allocated to the first virtual machine and to maintain an inactive list associated with the inactive status, wherein monitoring the multiple first virtual machine further comprises:
      maintaining an active list that includes at least one of the multiple first virtual machines associated with an active status and the inactive list;

updating the status of each first virtual machine from the active status to the inactive status by moving the first virtual machine from the active list to the inactive list;

in response to determining that the resource consumption level is lower than a first predetermined level, moving the first virtual machine to a position on the inactive list that represents a low level of inactivity;

in response to determining that the resource consumption level is lower than a second predetermined level below the first predetermined level, moving the first virtual machine to a position on the inactive list that represents a high level of inactivity; and in response to receiving a request to allocate resources to a second virtual machine, checking the inactive list to determine whether any of the multiple first virtual machines has the inactive status, and in response to the inactive list including at least one of the multiple first virtual machines:

selecting, for having a higher level of inactivity among the multiple first virtual machines with the inactive status, at least one of the multiple first virtual machines allocated with resources that are sufficient to satisfy the requested resources in the request from the inactive list, wherein the higher level of inactivity is associated with an order on the inactive list;

releasing resources allocated to the selected at least one of the multiple first virtual machines; and reallocating the released resources to the second virtual machine.

10. The non-transitory computer-readable storage medium of claim 9, further comprising: based on a request, reactivating the first virtual machine by moving the first virtual machine from the inactive list to the active list, or changing a position of the first virtual machine on the inactive list to represent a lower level of inactivity.

11. The non-transitory computer-readable storage medium of claim 9, wherein monitoring the multiple first virtual machines is further to update the status of each first virtual machine based on a runtime lease, a storage lease, or both, of the first virtual machine.

12. The non-transitory computer-readable storage medium of claim 11, wherein monitoring the multiple first virtual machines further comprises:

in response to determining that the runtime lease has expired, moving the first virtual machine from the active list to the inactive list.

13. The non-transitory computer-readable storage medium of claim 11, wherein monitoring the multiple first virtual machines further comprises:

in response to determining that the storage lease has expired, moving the first virtual machine to a position on the inactive list that represents a high level of inactivity.

14. The non-transitory computer-readable storage medium of claim 9, wherein selecting the at least one first virtual machine further comprises:

selecting the at least one of the multiple first virtual machines based on a ranking of the level of inactivity from a position of the inactive list that represents a highest level of inactivity to a position of the inactive list that represents a lowest level of inactivity;

comparing resources allocated to the at least one first virtual machines with resources requested in the request; and based on the comparison, selecting the at least one first virtual machine if release of the resources allocated to the at least one first virtual machine satisfies the resources requested in the request.

15. A computer system to perform resource management in a virtualized computing environment, wherein the computer system comprises:

a processor; and a non-transitory computer readable medium having stored thereon instructions that, when executed by the processor, causes the processor to:

monitor multiple first virtual machines to update a status of each first virtual machine to an inactive status based on a resource consumption level of resources allocated to the first virtual machine and to maintain an inactive list associated with the inactive status, wherein the processor is further configured to:

maintain an active list that includes at least one of the multiple first virtual machines associated with an active status and the inactive list;

update the status of each first virtual machine from the active status to the inactive status by moving the first virtual machine from the active list to the inactive list;

in response to determining that the resource consumption level is lower than a first predetermined level, move the first virtual machine to a position on the inactive list that represents a low level of inactivity;

in response to determining that the resource consumption level is lower than a second predetermined level below the first predetermined level, move the first virtual machine to a position on the inactive list that represents a high level of inactivity; and in response to receiving a request to allocate resources to a second virtual machine, check the inactive list to determine whether any of the multiple first virtual machines has the inactive status, and in response to the inactive list including at least one of the multiple first virtual machines:

select, for having a higher level of inactivity among the multiple first virtual machines with the inactive status, at least one of the multiple first virtual machines allocated with resources that are sufficient to satisfy the requested resources in the request from the inactive list, wherein the higher level of inactivity is associated with an order on the inactive list;

release resources allocated to the selected at least one of the multiple first virtual machines; and reallocate the released resources to the second virtual machine.

* * * * *